United States Patent [19]

Briska et al.

[11] Patent Number: 4,689,260

[45] Date of Patent: Aug. 25, 1987

[54] ABRASION-RESISTANT MAGNETIC RECORDING DISK

[75] Inventors: Marian Briska, Rottenburg; Gerhard Elsner, Sindelfingen; Holger Hinkel, Boeblingen, all of Fed. Rep. of Germany

[73] Assignee: International Business Machines Corporation, Armonk, N.Y.

[21] Appl. No.: 782,839

[22] Filed: Oct. 2, 1985

[30] Foreign Application Priority Data

Oct. 31, 1984 [EP] European Pat. Off. ........ 84113055.2

[51] Int. Cl.⁴ .......................... G11B 5/68; G11B 5/82
[52] U.S. Cl. .................... 428/161; 360/135; 427/131; 428/694; 428/900
[58] Field of Search ........... 428/694, 900, 161; 427/131; 360/135

[56]  References Cited

U.S. PATENT DOCUMENTS 2,501,126  3/1950  Howell .............................. 360/135
4,351,010  9/1982  Arai et al. ......................... 360/135
4,430,387  2/1984  Nakagawa et al. ................. 360/135
4,539,265  9/1985  Yazawa et al. ..................... 427/131

FOREIGN PATENT DOCUMENTS 59-175033  10/1984  Japan ................................ 360/135

*Primary Examiner*—Paul J. Thibodeau
*Attorney, Agent, or Firm*—Thomas R. Berthold

[57] ABSTRACT

A magnetic recording disk comprises a magnetic layer consisting of a binder and magnetic particles, a silicon substrate and abrasion-resistant material formed on the silicon substrate. The abrasion-resistant material is in the form of elevations which protrude from the silicon substrate and whose surface is coplanar with the surface of the magnetic layer. The abrasion-resistant elevations are formed on the substrate in a predetermined uniform distribution either after the surface of the substrate has been blanket doped and/or covered with a layer comprising aluminum as a main component, by tempering and optionally oxidizing; or after the surface of the substrate has been selectively doped, by etching off the undoped regions of the surface of the substrate.

6 Claims, 18 Drawing Figures

ABRASION-RESISTANT MAGNETIC RECORDING DISK

BACKGROUND OF THE INVENTION

The invention relates to a magnetic disk which comprises a silicon substrate and a magnetic layer deposited on the substrate and consisting of a binder, magnetic particles and an abrasion-resistant material, and to a method of making such a magnetic disk, where a substrate is provided and a layer comprising at least one binder and magnetic particles is deposited.

High capacity magnetic disks used at present comprise substrates, preferably of aluminum, aluminum-magnesium or silicon, and a magnetic layer that is deposited thereon and preferably of a 1 μm thickness, comprising a magnetic particle-filled resin. To make sure that the magnetic disk is able to resist the effect of the hard magnetic head of ceramic material which drags over the disk in the start/stop phase the resin is additionally filled with aluminum oxide particles amounting to approximately 2 percent by volume of the layer. Actually, the magnetic head does not drag on the resin directly but on the aluminum oxide particles serving as a support. In principle, such a deposit would satisfy all requirements provided the adhesion of the aluminum oxide particles in the resin matrix is very high. However, this does not apply; in fact, during the operation of the disk a knocking-out of aluminum oxide particles is frequently revealed. The consequence of this knocking-out is that the disk is subjected to increased abrasion in all those places where aluminum oxide particles are knocked out, and that the hard aluminum oxide particles placed on the disk surface contribute to a wear of the disk surface and of the magnetic head. This finally leads to a premature failure of the system consisting of magnetic disk and magnetic head. This problem is encountered as early as in functional tests after the termination of disk production, or when the disk is used at the customers' place, therefore it has caused up to now serious disturbances of production, and high maintenance costs.

SUMMARY OF THE DISCLOSURE

It is therefore the object of the invention to provide a magnetic disk which comprises a magnetic layer consisting of a binder, magnetic particles and an abrasion-resistant material, and which is deposited on a substrate, and where the abrasion-resistant material remains firmly anchored even in those cases where the magnetic head drags over the disk, and to provide a method with which such a magnetic disk can be made reproducibly, maintaining close tolerances in factory production at a minimum price.

The elevations of abrasion-resistant material grow either out of the substrate directly, or out of a layer firmly adhering to the substrate. They are therefore optimally anchored. In this manner, no abrasion-resistant material is knocked out of the magnetic layer by the magnetic heads, so that no particles of the abrasion-resistant material can collect on the magnetic disk surface. Furthermore, contrary to the known magnetic disks, the elevations, not having a rounded-off tip or surfaces parallel to the disk surface, do not present a surface of attack to the magnetic head. The number of elevations, which is on the order of $10^4$ to $10^6/cm^2$, appears high, but owing to the fact that relative to the substrate surface the elevation cross-section is small, only a minor part of the substrate surface shows elevations, whereas the major part is smooth so that no disturbancies of the magnetic layer smoothness are to be expected, particularly in those cases where the elevations consist of silicon. Even if the elevations consist of an oxide, e.g. aluminum oxide, they have at least the same hardness as the aluminum oxide particles used in the former magnetic disks. The silicon substrate does not necessarily have to give the magnetic disk its mechanical stability, i.e. it does not have to be of the necessary thickness, in fact, it can also be available in the form of a thin layer, e.g. applied on a substrate by cathode sputtering, the substrate being for instance aluminum or an aluminum alloy, as e.g. aluminum magnesium.

If the silicon substrate consists of a monocrystalline silicon wafer the elevations are advantageously provided in the form of pyramids which consist of silicon containing approximately $5 \times 10^{18}$ aluminum atoms/cm$^3$.

In an advantageous embodiment of the magnetic disk according to the invention, spike-shaped aluminum oxide elevations abraded at the top protrude from the silicon substrate, and the rest of said silicon substrate is covered with an aluminum oxide layer onto which the binder in the magnetic layer adheres extremely well.

The method according to the invention uses process steps and devices which are partly known and for example applied in semiconductor technology, so that expenses can be reduced. On the other hand, using these process steps and devices did not make obvious their use for achieving the object of the present invention, for the surprisingly advantageous results were achieved with the method according to the invention only through the novel combination of the partly known process steps.

It is of advantage if in the method according to the invention the silicon substrate is doped on its surface with boron, and covered with a thin aluminum layer, and subsequently cured at about 350° C. with aluminum spikes growing on the substrate, if the aluminum spikes and the aluminum layer are anodically oxidized forming aluminum oxide spikes and an aluminum oxide layer, and if after the forming of the layer consisting of binder and magnetic particles there follows a grinding process until the points of the spikes are exposed. The boron doping is a condition for the forming of the aluminum spikes, and for their regular distribution. The doping thickness determines the surface density of the aluminum spikes.

In another advantageous embodiment of the method as disclosed by the invention the silicon substrate is arsenic-doped, forming a thin surface layer of a predetermined thickness, an insulating layer is applied on the surface layer, a predetermined number of heavy ions is implanted in the layer, subsequently the layer is etched off selectively in the area of the heavy ion traces, the arsenic doped surface layer is selectively boron-doped through the thus formed holes, and the insulating layer and the still remaining arsenic-doped material is etched off.

In a third advantageous embodiment of the method as disclosed by the invention, the monocrystalline silicon substrate is covered with silicon-containing aluminum or successively with aluminum and silicon, then tempered in an inert gas atmosphere, and cooled with silicon pyramids forming (the number of silicon pyramids of the correct height being controlled via the silicon quantity, the silicon distribution in the layer deposited, and the tempering and cooling period) and finally the silicon pyramids are exposed by etching off the aluminum.

In all above mentioned embodiments of the method according to the invention, the necessary thickness and the regular distribution of the elevations is advantageously achieved without having to provide additional masking steps or any other further steps ensuring the selectivity of the process. The correct density and distribution of the elevations are achieved by a respective determination of the process parameters which is easily reached by simple tests. The method of the invention is thus not only quite uncomplicated but also ensures a considerable reduction of possible errors, and furthermore permits closer manufacturing tolerances without the reproducibility of the method being impaired.

In the following, the invention will be described with reference to embodiments specified by drawings.

DESCRIPTION OF THE PREFERRED EMBODIMENTS

In the magnetic disk according to the invention, the abrasion-resistant material appears in the form of elevations (3, 13, 23) which protrude over the surface of the silicon substrate (1) carrying a layer (5) containing a binder and magnetic particles, and which are connected thereto and show a predetermined distribution.

The magnetic disk is made possible in that on a substrate (1) the elevations (3, 13, 23) are grown by tempering in a predetermined distribution, or produced by selective etching of the surface of the substrate (1) owing to different doping, and in that subsequently a mixture of the binder and the magnetic particles is applied.

In the following, various embodiments of the magnetic disk as disclosed by the invention, and their production by means of different variations of the method according to the invention will be described in detail.

The first embodiment of the magnetic disk according to the invention and of its production in accordance with an embodiment of the method as disclosed by the invention will be described with reference to FIGS. 1A-1D.

Figure 1A:
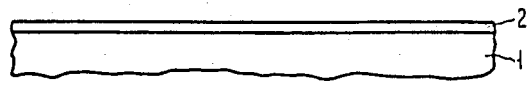
FIG. 1, parts A through D, are cross-sections of part of an embodiment of the structure according to the invention, in various stages of its production according to an embodiment of the method as disclosed by the invention.
Figure 1B:
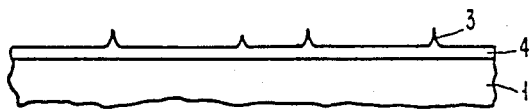

In this embodiment of the magnetic disk in accordance with the invention, the abrasion-resistant material exists in the form of spikes consisting of a very hard material and grown on the substrate surface. Substrate 1 consists of silicon, which can be a silicon plate, or a thin layer deposited on a substrate, e.g. on a disk consisting of aluminum or of an aluminum alloy, as aluminum magnesium, such deposition being preferably performed by means of cathode sputtering. Silicon substrate 1 is boron-doped on its surface, so that the surface concentration ranges between $10^{18}$ and $10^{20}/cm^3$. Subsequently, an aluminum layer 2 between 100 and 1000 nm thick is deposited on silicone substrate 1. FIG. 1A depicts part of the structure in this stage of its manufacture. There follows a tempering step at temperatures between 350° and 400° C., the aluminum spikes growing out of aluminum layer 2 and being uniformly distributed over it. Their density, which is perferably on the order of one spike per 100 $\mu m^2$, is determined by the boron doping of substrate 1. In the given range of $10^{18}$ to $10^{20}$ boron atoms/$cm^3$ the aluminum spike density on the substrate varies by a factor of 6. The tempering period determines the height of the aluminum spikes. The desired height ranges between approximately 1 and 2 $\mu m$. In the next process step, aluminum layer 2 and the aluminum spikes are anodically oxidized, the aluminum on the positive potential being processed in an electrolyte solution consisting e.g. of a solution of ammonium pentaborate in ethylene glycol, at voltages amounting to approximately 20 Volts. FIG. 1B depicts the structure after the anodic oxidation, the aluminum oxide spikes with the reference number 3, and the aluminum oxide layer produced out of aluminum layer 2 having the reference number 4. Onto the structure of FIG. 1B a layer 5 comprising a binder and magnetic particles is applied by spinning, and subsequently cured. The binder in layer 5 preferably consists of an epoxide resin, i.e. typically of an epoxide resin of the bisphenol A-epichlorohydrin type. The magnetic particles typically consist of $\gamma$-$Fe_2O_3$.

Figure 1C:
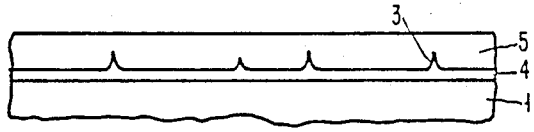
Figure 1D:
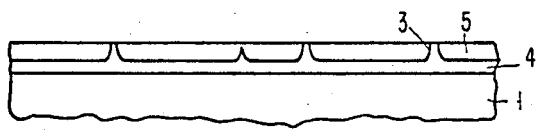

Layer 5 is of such a thickness that it substantially covers the aluminum oxide spikes. 3. FIG. 1C shows the structure reached at that stage. In the last process step, layer 5 is ground off to such an extent that the points of the aluminum oxide spikes are exposed and slightly polished. A cross-section through part of the finished magnetic disk made in this manner is depicted by FIG. 1D.

It is a particular advantage of the present method that by means of the step of boron doping the aluminum spikes could be uniformly distributed as well as provided with the correct density—depending on the intensity of the doping. Another advantage of the method is that—without having to abandon any of the advantageous characteristics—the magnetic layer can be deposited on highly different substrates. In the embodiment of the magnetic disk according to the invention as depicted in FIG. ID, the abrasion-resistant component consists of the same material as in the known disks, but it is much more firmly anchored than in the known disks. Owing to the specific kind of production, the abrasion-resistant material does not involve any loss of hardness, in fact, the aluminum oxide spikes have Mohs hardnesses of up to 9.

For making another embodiment of the magnetic disk as disclosed by the invention, a layer consisting of aluminum and silicon, or an aluminum layer and a silicon layer are deposited on a monocrystalline silicon substrate, subsequently tempered and cooled again, with silicon (saturated with $5 \times 10^{18}$ aluminum atoms/cm$^3$) being epitaxially deposited on the substrate surface in the form of small pyramids. After the aluminum has been etched off, a mixture consisting of the binder and the magnetic particles is applied as a layer, subsequently cured and finally abraded until the upper surface of the pyramids has been exposed. There is no blanket deposition of the silicon, deposition is effected only in active centers of the silicon crystal since these centers show a high tendency of crystal seed formation. The density of the active centers and thus the surface density of the pyramids is easily controlled without there having to be any necessity of processing the substrate by means of selective process steps, e.g. using a mask. The surface density is controlled by influencing the silicon distribution in the material applied on the substrate. The specifications concerning the center formation will be preceded by some general remarks.

At a temperature of approximately 450° C. the saturation concentration of silicon in solid aluminum is 1.2 percent by weight. At 577° C., the saturation concentration of silicon in aluminum is higher by 0.4 percent by weight only, i.e. it is about 1.6 percent by weight. The eutectic point of the system AlSi is at 577° C. In the phase which is fluid at this temperature the silicon concentration can increase to up to 12 percent by weight. If after tempering the silicon-saturated aluminum is cooled the silicon precipitates. If there are active centers on the substrate surface, the silicon is preferably deposited epitaxially at these active centers, provided the cooling is effected slowly. With increasing cooling speed an increasing amount of silicon remains in the aluminum in the form of small crystallites consisting of an intermetallic compound. If aluminum which is adjacent to silicon areas is heated to a temperature where its silicon content is at least partly beneath the saturation concentration, it has the tendency of increasing the silicon contents up to saturation concentration by dissolving the adjacent silicon areas. In all those places where silicon is dissolved out of the monocrystalline silicon substrate active centers are formed. The distribution of the centers over the substrate surface is statistical (homogeneous); their number depends on the extent to which in the aluminum adjacent to the silicon substrate the silicon concentration is beneath saturation concentration. The number of active centers can therefore be influenced by the composition and the structure of the material on the substrate. Most of the active centers will be formed when the material applied consists of pure aluminum. (However, in that case only a small amount of silicon will be available for growing pyramids). If first an aluminum layer is applied and subsequently a silicon layer containing enough silicon for saturating the aluminum, a very high number of active centers will be formed during tempering. If, on the other hand, the aluminum and the silicon are deposited simultaneously in such a ratio that the aluminum is saturated with silicon at tempering temperature, only a very small number of active centers will be formed. A number of active centers ranging between these two extreme cases is reached if first an aluminum layer is applied whose thickness corresponds approximately to half the thickness of the aluminum layer, and subsequently a silicon layer with enough silicon for saturating the entire aluminum to be applied, and finally the second half of the aluminum layer. This means that by correspondingly controlling the deposition of aluminum and silicon on the silicon substrate the number of active centers and therefore of the growing silicon pyramids can be controlled to such an effect that the desired pyramid surface density of 100 to 10,000 per cm$^2$ can be realized. The precise parameters with which the aluminum and the silicon are to be applied can be determined by simple tests.

With reference to FIGS. 2 and 3, the forming of the silicon pyramids on the silicon substrate and the subsequent production of the magnetic disk will now be discussed for the two above mentioned extreme cases.

Figure 2A:
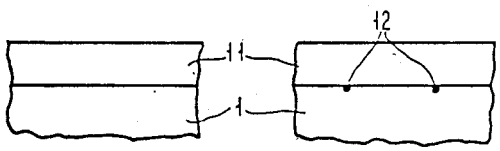
FIG. 2, parts A through C, are cross-sections of part of another embodiment of the structure according to the invention in various stages of its production according to further embodiments of the method as disclosed by the invention.
FIG. 2D is a prespective view of the embodiment of FIGS. 2A through 2C.
Figure 2B:
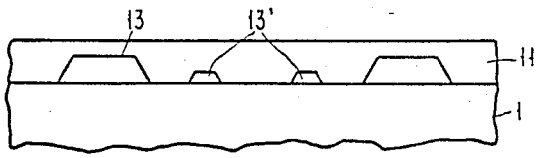
Figure 2C:
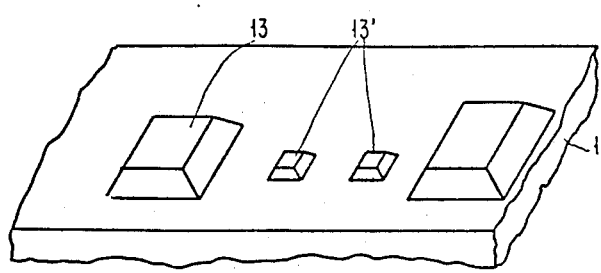
Figure 2D:
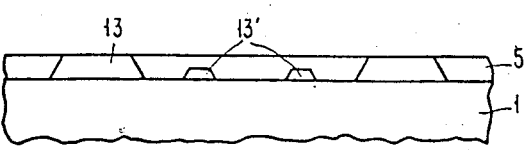

Onto a silicon substrate 1 which preferably has a (100) orientation a layer 11 is vapor deposited which consists of aluminum and approximately 1.2 percent by weight silicon referring to the overall quantity of the material applied. FIG. 2A depicts part of the thus obtained structure. Subsequently, tempering is carried out at a temperature between 400° and 480° C., in an inert gas atmosphere. As shown by FIG. 2B, a relatively small amount of active centers 12 are formed in this process. During slow cooling (approximately 5° C./min.) epitaxially relatively big pyramids 13 then grow on silicon substrate 1 in all those places where active centers 12 have formed. It is furthermore possible to grow further, but much lower pyramids 13' beside pyramids 13. The thus obtained structure is represented in FIG. 2C. In the next process step, layer 11 is removed, preferably by means of an acid mixture containing nitric acid, hydrochloric acid and phosphoric acid, and thus the surface of substrate 1 and pyramids 13 and 13' are exposed. FIG. 2C shows in a perspective view a segment of the thus obtained structure. The cross-section view of FIG. 2D depicts a segment of the magnetic disk after a layer 5 comprising a binder, i.e. preferably an epoxide resin, and magnetic particles as e.g. $\gamma$-Fe$_2$O$_3$ has been deposited, subsequently cured and finally abraded, until the surfaces of layer 5 and of the silicon pyramids are coplanar. The magnetic disk of FIG. 2D incorporates the one extreme case where the number of silicon pyramids is relatively small. The other extreme case will now be discussed with reference to FIG. 3.

Figure 3A:
FIG. 3, parts A through C and E, are cross-sections of a part of another embodiment of the structure according to the invention in various stages of its production according to further embodiments of the method as disclosed by the invention.
FIG. 3D is a perspective view of the embodiment of FIGS. 3A through 3C.
Figure 3B:
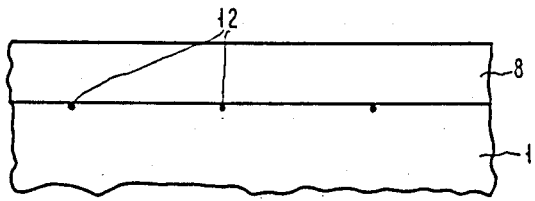
Figure 3C:
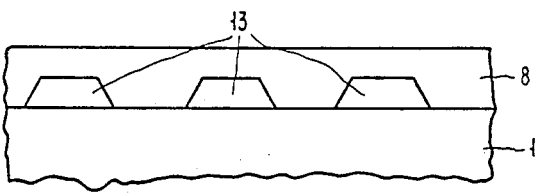

FIG. 3A depicts a segment of a structure where onto a silicon substrate 1 an aluminum layer 6 and thereon a thin silicon layer 7 have been deposited. According to the thickness ratio of layers 6 and 7, the silicon weight in layer 7 amounts to approximately 1.2% of the overall weight of aluminum and silicon. The thus obtained structure is heated to a temperature between 400° and 480° C., and tempered. During this process, the silicon diffuses from layer 7 into aluminum layer 6, forming a layer 8 comprising aluminum and silicon. Since at the beginning of the tempering process the aluminum at the border-line to silicon substrate 1 does not contain any silicon, the silicon of silicon substrate.1 is eagerly dissolved by the aluminum so that a high number of active centers 12 is obtained. The tempering result is represented by FIG. 3B in a schematic cross-section. If subsequently the structure is left to cool slowly (approximately 5° C./min.) silicon epitaxially precipitates at active centers 12 from layer 8, forming small silicon pyramids 13 (see FIG. 3C). Apart from the number of active centers and the tempering and cooling duration, the height of silicon pyramids 13 depends on the absolute silicon quantity in layer 8. As the maximum soluble quantity (saturation concentration in solid aluminum) has an upper limit of 1.6% irrespective of the tempering temperature, the silicon quantity available can be influenced only via the thicknesses in which layers 6 and 7 are applied.

Figure 3D:
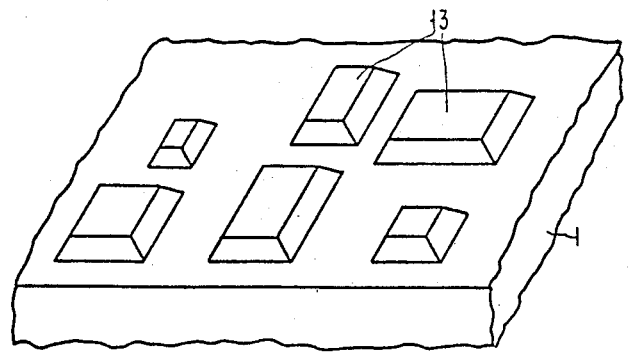

FIG. 3D shows in a schematic perspective view a segment of the structure after layer 8 has been removed, e.g. with the above mentioned acid mixture. Subsequently a layer 5 consisting of the binder which is preferably an epoxide resin, and of magnetic particles, as e.g. $\gamma$-$Fe_2O_3$ is spun onto the substrate surface. The gradually rising slopes of pyramids 13 are particularly advantageous as they are of a specially low influence on the flow of the resin during spinning. Layer 5 is then cured and abraded until the surface of layer 5 is coplanar with the surface of silicon pyramids 13. The thus completed magnetic disk is depicted in FIG. 3E in a schematic cross-section.

Figure 3E:
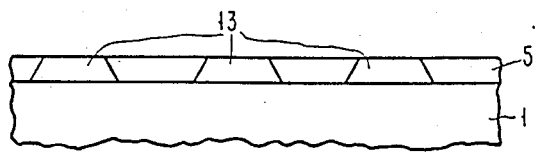

In FIGS. 2D and 3E, silicon pyramids 13 are practically part of substrate 1, a better anchoring for the abrasion-resistant material cannot be reached. The hardness of pyramids 13 is considerable, it can be increased if necessary by converting the silicon on the surface into $Si_3N_4$. Similarly as in the structure according to FIG. 1D, the silicon substrate is smooth apart from the elevations, so that no defects whatever are to be expected for the magnetic layer.

With reference to FIG. 4, another embodiment of the magnetic disk according to the invention will now be discussed which is highly similar to the above specified embodiments but which is made in accordance with a process considerably different than the one specified above.

The process starts with a silicon substrate 1 of low boron doping. Silicon substrate 1 can be a silicon disk or a silicon layer deposited, e.g. by means of cathode sputtering, onto a substrate consisting preferably of aluminum or of an aluminum alloy, as e.g. aluminum magnesium. Silicon substrate 1 is blanket deposited with an arsenic doping which is of such a height that in a depth of approximately 1 $\mu$m it amounts to $10^{17}$ arsenic atoms/$cm^3$. Doping can be implemented by diffusion or ion implantation. The thus obtained structure where for better demonstration only one surface has been arsenic-doped is shown in segments and in a schematic cross-section by FIG. 4A where the arsenic-doped layer has been given the reference number 17. Onto layer 17, a layer 18 of an insulating material is applied which is preferably a polyimide advantageous because of its highly reproducible etchability in alkaline media. The thickness of layer 18 is 2 to 3 $\mu$m.

Figure 4A:
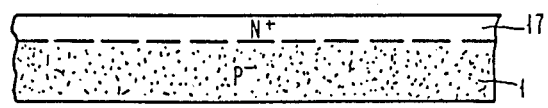
FIG. 4, parts A through E, are cross-sections of part of a third embodiment of the structure according to the invention in various stages of the production according to a fourth embodiment of the method as disclosed by the invention.
Figure 4B:
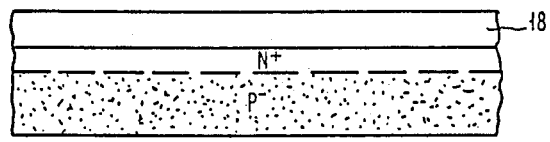
Figure 4C:
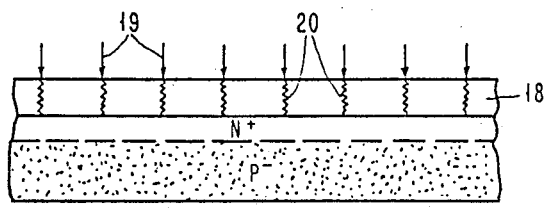

FIG. 4B shows the thus obtained structure. Layer 18 is bombarded with highly energetic heavy ions 19 with an energy of 5 to 20 MeV. Latent tracks 20 are thus produced in layer 18 along which the etching speed is increased locally. This local increase of the etching speed appears for insulating materials only. This is a damaging mechanism which differs from that of conventional ion implantation. The silicon thereneath is not damaged. In order to achieve, in a future process step, the desired density of elevations on the silicon substrate $Xe^+$ ions/$cm^2$ in the order to $10^5$ are bombarded into layer 18. Any measure, as e.g. providing a mask, to ensure uniform distribution of tracks 20 over layer 18 are not necessary, in fact, the $Xe^+$ ion beam is guided over layer 18 at such a height that each area is exposed to the ion beam for an equal period. With this process, a uniform distribution of tracks 20 over layer 18 is achieved. FIG. 4C represents the structure after irradiation.

Figure 4D:
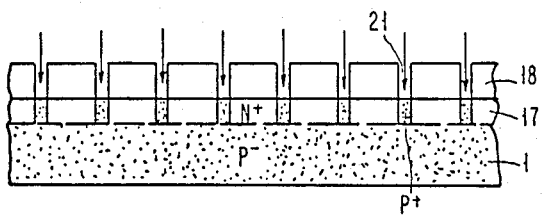
Figure 4E:
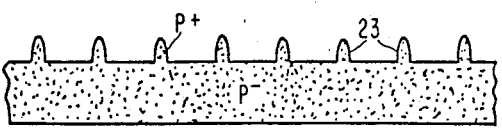
Figure 4F:
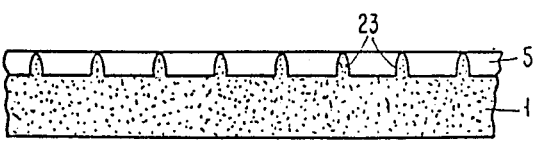

In the next process step, layer 18 is selectively etched in the range of tracks 20. If layer 18 consists of a polyimide, etching preferably takes place with a 1 to 2 molar KOH solution. The etching is highly reproducible, and continuous channels 21 are obtained whose diameter is between 0.5 and 1 $\mu$m, depending on the etching solutions. The resulting structure is shown in FIG. 4D. Now, approximately $10^{16}$ boron atoms/$cm^2$ are blanket implanted with an energy of 130 KeV in the arsenic doped layer 17, layer 18 with channels 21 being used as an implantation mask. The structure after implantation is shown in a cross-section by FIG. 4D. After ion implantation, layer 18 is completely removed. Subsequently, by means of a high temperature tempering step, in those places where boron ions have been implanted, areas with a $P^+$ doping are generated by a re-distribution of the boron ions. If the silicon substrate has been deposited on a substrate consisting of aluminum or of aluminum-magnesium the boron implantation is effected—since there can be no high temperature tempering for boron re-distribution under these circumstances—with an energy continously changing in the range between 20 and 260 KeV. The disk substrate is then etched in a hot solution containing for 10 parts ethylene diamine one part pyrocatechol, with the $N^+$ zones being completely removed. The $P^+$ doped regions remain and from a matrix of elevations 23 uniformly distributed over the substrate. In wet etching, elevations 23 are affected in such a manner that they show rounded-off slopes, which increases their abrasion-resistance in the completed magnetic disk and which is furthermore of advantage for the flow characteristics of the mixture containing the magnetic particles in the subsequent coating by means of spinning. After layer 5 which preferably consists of an epoxide resin and $\gamma$-$Fe_2O_3$ has been applied by spinning, and its curing and removal until its surface is coplanar with the peaks of elevations 23, the magnetic disk is finished. FIG. 4F depicts a segment of this magnetic disk.

The last-described method is of particular advantage because there the substrate can be available as a thin silicon layer deposited on a substrate consisting of another material, because the silicon elevations are all produced with precisely the same height so that grinding for compensating height differences is not necessary, and because a homogeneous distribution of silicon elevations 23 on the substrate is reached in a very uncomplicated manner. The magnetic disk depicted in FIG. 4F is considered highly advantageous because the abrasion-resistant material, i.e. elevations 23, are optimally anchored in the silicon substrate, and because their round corners prevent the damaging of the magnetic head when in the start/stop phase it drags on the disk.

In the following, the above described embodiments of the method as disclosed by the invention and the thus made magnetic disk will once more be presented in detail with reference to five specific examples.

EXAMPLE 1

This example describes the production of a magnetic disk as represented in FIG. 1D. A silicon disk is boron-doped so that the surface concentration is approximately $10^{19}$ boron atoms/$cm^3$. Subsequently, the silicon disk is exposed to vapor deposition of an aluminum film of approximately 500 nm thickness. After vapor deposition, the silicon disk is tempered for approximately 20 minutes at 350° C., with aluminum spikes approximately 1 μm high growing. The aluminum film and the aluminum spikes are anodically oxidized. The anodic oxidation is effected in a bath consisting of a solution of ammonium pentaborate in ethylene glycol (17 g ammonium pentaborate per 100 ml ethylene glycol). A voltage is applied which during oxidation when the structure is connected to the positive potential rises continuously from 5 to 20 Volts. Onto the substrate, a mixture consisting of an epoxide resin on the basis of bisphenol A-epichlorohydrine and $\gamma$-$Fe_2O_3$ particles is applied by spinning. Subsequently, the coating is polished and partly removed, with the aluminum oxide spikes being exposed and slightly polished. The density of the aluminum oxide spikes uniformly distributed over the magnetic disk surface was in the order of 1 per 100 $\mu m^2$. It was found that the thus made magnetic disk showed excellent abrasion-resistance characteristics, and even after extended use no particle was found on the magnetic disk surface.

EXAMPLE 2

In the following the production of a magnetic disk as depicted in FIG. 2D in a schematic cross-section will be described. Onto a monocrystalline silicon disk with (100) orientation an AlSi layer was vapor deposited which was approximately 1 μm thick and contained approximately 1.2 percent by weight silicon. Subsequently, it was tempered for one hour at 450° C. in argon, and cooled down within 10 minutes. The AlSi layer was then etched off with an acid mixture containing nitric acid, hydrofluoric acid and phosphoric acid. When the aluminum was etched off, relatively large pyramids of silicon became visible which were 1 μm high and showed gradually rising slopes. Onto the substrate with the silicon pyramids, a mixture consisting of epoxide resin on the basis of bisphenol A-epichlorohydrine and $\gamma$-$Fe_2O_3$ was applied by spinning, cured and polished until the upper surface of the silicon pyramids had been exposed.

On the thus made magnetic disk, the silicon pyramids were uniformly distributed over the disk substrate. Even after extended use no silicon particles were found on the disk surface. All the same, the abrasion-resistance of the magnetic disk was not yet optimal which seemed to be due to the fact that the number of silicon pyramids was not high enough yet so that in the start/stop phase the magnetic head did not continuously contact a silicon pyramid.

EXAMPLE 3

This example describes the production of a magnetic disk as described in schematic cross-section in FIG. 3E. The method applied for this example differs from that of Example 2 only in that not an AlSi layer but first an approximately 0.85 μm thick aluminum layer and subsequently a 0.01 μm thick silicon layer are vapor deposited. The removal of the aluminum and the silicon layer revealed a high amount of small silicon pyramids epitaxially grown on the silicon substrate. In the case of the magnetic disk made in accordance with the present example the magnetic layer, after it had been polished to such an extent that the peaks of the silicon pyramids had been exposed, was so thin and the number of silicon pyramids was so high that the disk obtained did no longer correspond to specifications. However, the silicon pyramids were homogeneously distributed over the disk substrate in this case, too.

EXAMPLE 4

The method of the present example differs from the two preceding ones only in the manner in which the aluminum and the silicon are applied. First, a 0.4 μm thick aluminum layer and subsequently a 0.01 μm thick silicon layer, and finally a 0.45 μm thick aluminum layer were deposited on the silicon substrate. The magnetic disk made in this example corresponded to requirements in every respect. The number of silicon pyramids amounted to $10^5/cm^2$, the pyramids were uniformly distributed over the magnetic disk substrate, the magnetic layer had the correct height (approximately 1 μm) after it had been polished until the peaks of the pyramids were exposed, the abrasion-resistance of the magnetic disk was excellent, and even after extended use no silicon particles were found on the magnetic disk surface.

EXAMPLE 5

This example describes the production of a magnetic disk as represented in FIG. 4F in a schematic cross-section. A P$^-$ doped silicon disk substrate was blanket deposited with an arsenic doping of $10^{19}$ atoms/cm$^3$ (surface concentration), the arsenic concentration at 1 μm depth being about $10^{17}$ atoms/cm$^3$. The doping was blanket effected by ion implantation. The surface of the arsenic doped layer was coated with an approximately 2.5 μm thick polyimide layer. The polyimide layer was bombarded with xenon ions in a dosage of $10^5$ ions/cm$^2$ and an energy of approximately 10 MeV. The polyimide was subsequently exposed to an approximately 2 molar KOH solution, with continuous channels with a diameter of approximately 0.5 to approximately 1 μm being etched. Subsequently, boron ions in a dosage of $10^{16}$ atoms/cm$^2$ were implanted in the silicon substrate with an energy of 130 KeV, the channel-equipped polyimide layer being used as implantation mask. In the next process step, the polyimide layer was completely removed by further etching in the approximately 2 molar KOH solution. There followed a tempering step at 900° C. to re-distribute the implanted boron. The silicon disk substrate was now blanket etched in a hot ethylene diamine pyrocatechol soltution (10 weight parts ethylene diamine to 1 part pyrocatechol), with the arsenic-doped regions being completely removed. The P$^+$ regions generated in the re-distribution of the implanted boron remained unetched, with the exclusion of rounded-off slopes, and formed a matrix of elevations uniformly distributed over the silicon disk substrate. The elevations were approximately 1 μm high and provided in a density of approximately $10^5$ elevations/cm$^2$. Onto the thus formed silicon disk substrate a mixture of epoxide resin on the basis of bisphenol A-epichlorohydrine and $\gamma$-$Fe_2O_3$ was applied by spinning and subsequently polished until the layer was coplanar with the upper surface of the silicon elevations.

The thus made disk had excellent abrasion characteristics, an entirely smooth surface, and even after extended use no silicon particles were found on the magnetic disk surface.

While the preferred embodiments of the present invention have been illustrated in detail, it should be apparent that modifications and adaptations of those embodiments will occur to those skilled in the art without departing from the scope of the present invention as set forth in the following claims.

What is claimed is:

1. A magnetic recording disk comprising a monocrystalline silicon substrate, a magnetic layer applied on the substrate comprising a binder and magnetic particles, and abrasion-resistant material anchored to the substrate, the abrasion-resistant material being formed as a distribution of generally pyramid shaped elevations of silicon protruding above the surface of the substrate so as to be generally coplanar with the upper surface of the magnetic layer, the silicon elevations containing aluminum atoms at a concentration of approximately $5 \times 10^{18}$ per cubic centimeter.

2. The magnetic recording disk as claimed in claim 1 wherein the elevations on the substrate have a density of between $3 \times 10^5$ and $2 \times 10^6$ per square centimeter.

3. The magnetic recording disk as claimed in claim 1 further comprising a second substrate of aluminum or aluminum alloy onto which the silicon substrate is deposited.

4. A magnetic recording disk comprising a silicon substrate, a magnetic layer applied on the substrate comprising a binder and magnetic particles, a layer of aluminum oxide formed between the silicon substrate and the magnetic layer, and abrasion-resistant generally spike-shaped elevations formed on the aluminum oxide layer and protruding above the substrate so as to be generally coplanar with the upper surface of the magnetic layer.

5. A magnetic recording disk comprising a boron doped monocrystalline silicon substrate, a magnetic layer applied on the substrate comprising a binder and magnetic particles, and abrasion-resistant silicon elevations anchored to the substrate and protruding above the surface of the substrate so as to be generally coplanar with the upper surface of the magnetic layer, the silicon elevations having a boron concentration substantially higher than the boron concentration of the silicon substrate.

6. The magnetic recording disk as claimed in claim 5 further comprising a second substrate of aluminum or aluminum alloy onto which the silicon substrate is deposited.

* * * * *